United States Patent [19]
Ohneda et al.

[11] Patent Number: 6,012,006
[45] Date of Patent: Jan. 4, 2000

[54] CREW MEMBER DETECTING DEVICE

[75] Inventors: Katsushi Ohneda; Tomonori Taguchi; Haruyoshi Hayashi; Yoichi Hashimoto; Tadashi Horikoshi; Miyuki Demachi, all of Saitama, Japan

[73] Assignee: Kansei Corporation, Saitama, Japan

[21] Appl. No.: 08/759,712

[22] Filed: Dec. 6, 1996

[30] Foreign Application Priority Data

Dec. 7, 1995 [JP] Japan .................................. 7-319159

[51] Int. Cl.[7] ................................................. B60R 21/32
[52] U.S. Cl. ......................... 701/45; 280/735; 180/272; 701/47
[58] Field of Search ............................. 280/735; 701/45, 701/47; 180/272

[56] References Cited

U.S. PATENT DOCUMENTS

| | | | |
|---|---|---|---|
| 5,482,314 | 1/1996 | Corrado et al. | 701/45 |
| 5,626,359 | 5/1997 | Steffens et al. | 280/735 |
| 5,653,462 | 8/1997 | Breed et al. | 280/735 |
| 5,748,473 | 5/1998 | Breed et al. | 701/45 |
| 5,829,782 | 11/1998 | Breed et al. | 280/735 |
| 5,835,613 | 11/1998 | Breed et al. | 382/100 |
| 5,845,000 | 12/1998 | Breed et al. | 382/100 |
| 5,848,802 | 12/1998 | Breed et al. | 280/735 |
| 5,890,085 | 3/1999 | Corrado et al. | 701/47 |
| 5,901,978 | 5/1999 | Breed et al. | 280/735 |

*Primary Examiner*—William A. Cuchlinski, Jr.
*Assistant Examiner*—Olga Hernandez
*Attorney, Agent, or Firm*—Sughrue, Mion, Zinn, Macpeak & Seas, PLLC

[57] ABSTRACT

In a crew member detecting device, an acoustic wave generator element mounted on a vehicle body generates a standing wave between the acoustic wave generator element and a bucket seat, and an acoustic wave receiver element is provided in the region of the standing wave, to detect the presence of a person on the bucket seat from variations in the output of the acoustic wave receiver element which are due to the movement of the person on the bucket seat.

4 Claims, 11 Drawing Sheets

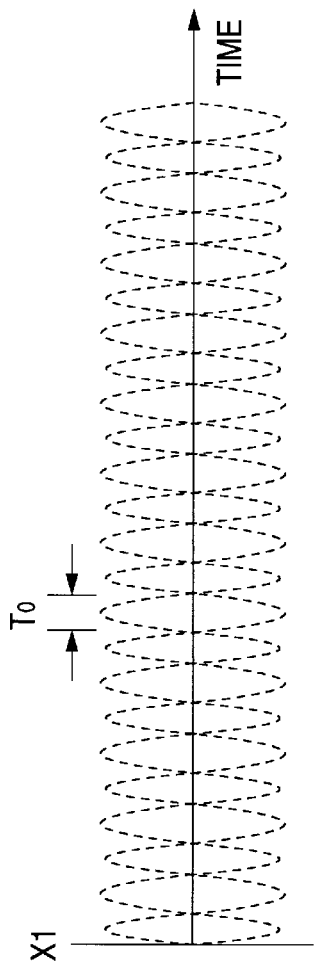
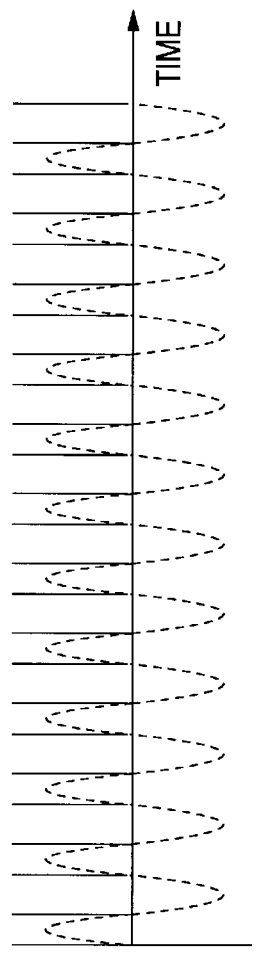
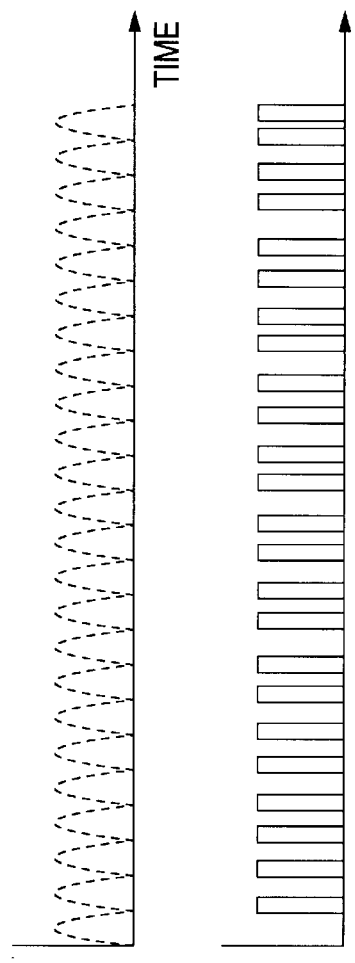
FIG. 7A
FIG. 7B
FIG. 7C
FIG. 7D

CREW MEMBER DETECTING DEVICE

BACKGROUND OF THE INVENTION

1. Field of the Invention

This invention relates to a crew member detecting device which detects whether or not a crew member is on the bucket seat, for instance, in a vehicle.

2. Description of the Prior Art

Prior to the description of a crew member detecting device of the invention, a vehicle crew member protecting device such as an air bag device will be described with reference to FIG. 1.

FIG. 1 shows a vehicle crew member protecting device which is to inflate air bags for both the driver's bucket seat and assistant driver's bucket seat in a vehicle when an accident occurs. When a collision occurs in a front-to-rear or rear-to-front direction of the vehicle, a sensor 1 applies an acceleration signal to an air bag inflation decision control circuit 2, where the degree of the accident is determined according to the magnitude and the duration time of the acceleration signal. When the circuit 2 determines that the accident is serious (damaging the crew members greatly), it applies an ignition current to a first squib 3 for the driver's bucket seat to inflate the driver's bucket seat air bag, and operates an inflation timing control circuit 4 to ignite second and third squibs 5 and 6 for the assistant driver's bucket seat at different time instants, to inflate driver's bucket seat air bags.

However, the vehicle crew member protecting device thus organized is disadvantageous in the following points: This is, a collision may occur even when the vehicle is traveling without a assistant driver. In this case, too, the device will operate; this is, the ignition currents are applied to all the first, second and third squibs 3, 5 and 6. Hence, in the case where the device is repaired so that the vehicle is used again, the repair work is not accomplished merely by replacing parts of the vehicle crew member protecting device; that is, the latter must be replaced in its entirety. Hence, the repair cost is relatively high.

In USA, some of the insurance companies decrease a premium for a vehicle which is so designed that, in such a case, the vehicle crew member protecting device can be repaired by replacing some of the parts. Hence, in Japan, too, the recent technical tendency of the vehicle crew member protecting device is such that, in the case where no crew member is on the assistant driver's bucket seat, the air bag for the assistant driver's bucket seat is not inflated. In this connection, what is provided is a switch which is turned on when a person sits on the assistant driver's bucket seat, namely, a mechanical sit-on switch, or a sheet-shaped switch board. However, since the switch is operated by a load applied thereto, it gives rise to another problem that it is operated not only when a person sits on it but also a piece of baggage is set on it.

SUMMARY OF THE INVENTION

Accordingly, an object of the invention is to eliminate the above-described difficulties accompanying a conventional crew member detecting device.

Another object of the invention is to provide a crew member detecting device which is based on a simple operating principle, and is simple in construction, and is able to distinguish whether a person is sitting on the bucket seat or whether an object like a piece of baggage is set on it.

The foregoing object of the invention has been achieved by the provision of a crew member detecting device which comrises:

an acoustic wave generator element mounted on a vehicle body for generating a standing wave between said acoustic wave generator element and a bucket seat;

an acoustic wave receiver element disposed in a region of the standing wave, for detecting the presence of a person on the bucket seat from variations in an output of said acoustic wave receiver element which are due to the movement of the person on the bucket seat.

The device of the invention functions as follows. In an automobile, a person on the bucket chair will move. Hence, in the case where a standing wave is provided between the side of the automobile and the person, then the number of waves thereof changes as the person moves. By detecting this change with the acoustic wave receiver element, it can be determined whether a person is on the bucket seat or whether an object like a piece of baggage is on it.

The above and other objects and features of the present invention will be more apparent from the following description taken in conjunction with the accompanying drawings.

BRIEF DESCRIPTION OF THE DRAWINGS

FIGS. 7A to 7D are waveform diagrams for a description of the operation of the device shown in FIG. 6;

DETAILED DESCRIPTION OF THE PREFERRED EMBODIMENTS

Preferred embodiments of the invention will be described with reference to the accompanying drawings.

First Embodiment

FIGS. 2 to 5 are diagrams for a description of the principle of the invention.

Figure 1:
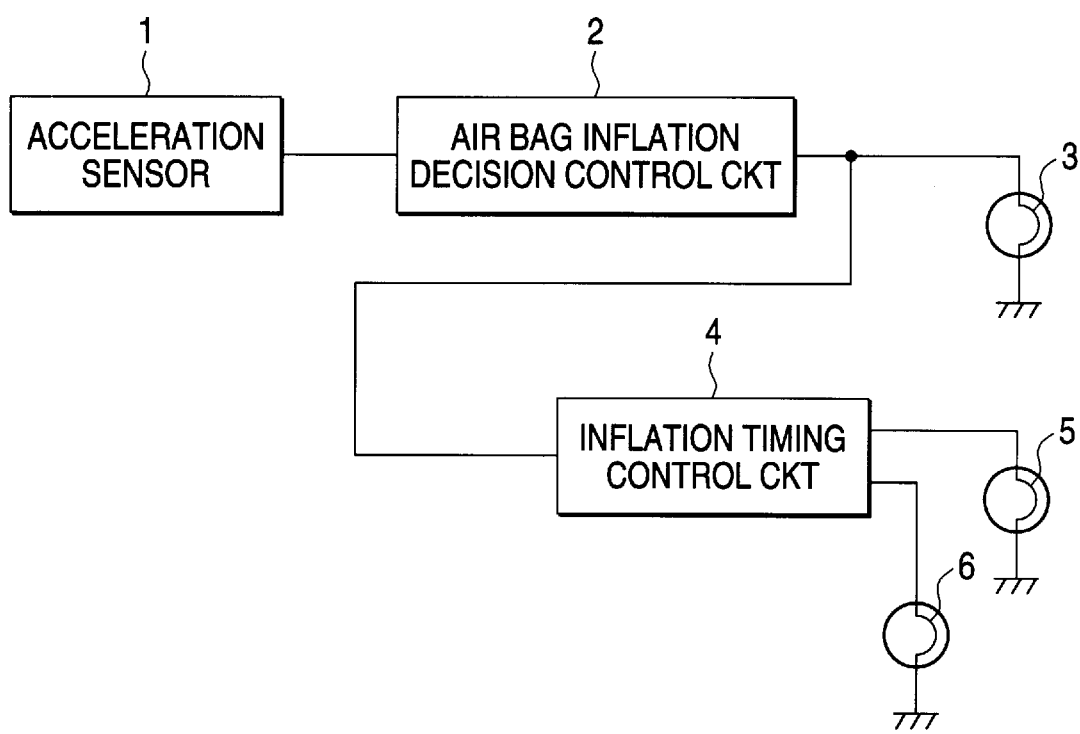
FIG. 1 is a block diagram outlining the arrangement of a conventional vehicle crew member protecting device.
Figure 2:
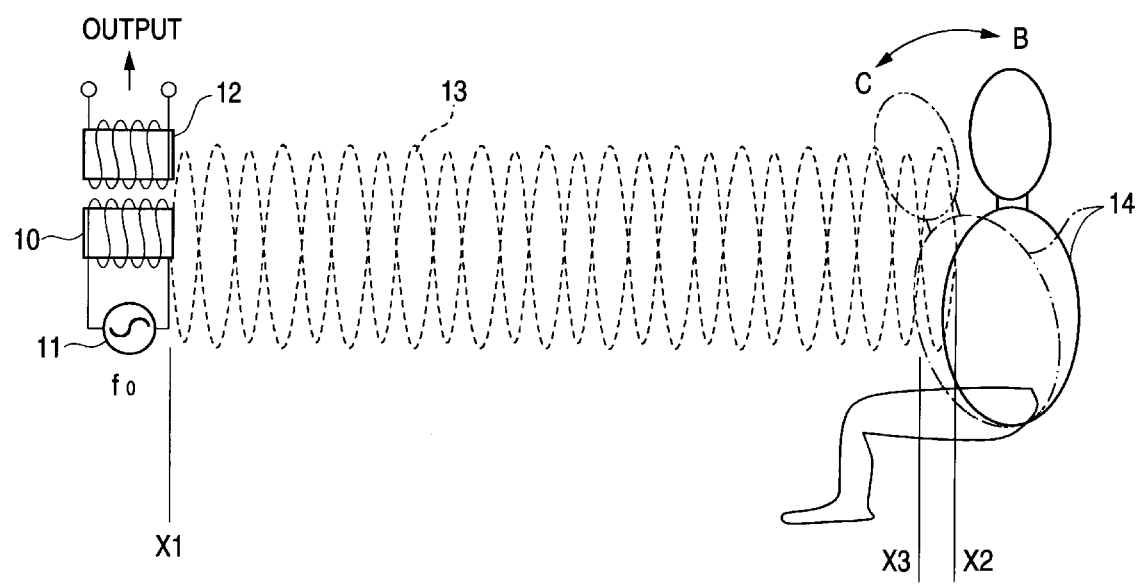
FIG. 2 is an explanatory diagram for a description of one principle of a crew member detecting device according to a first embodiment of the invention.
Figure 9:
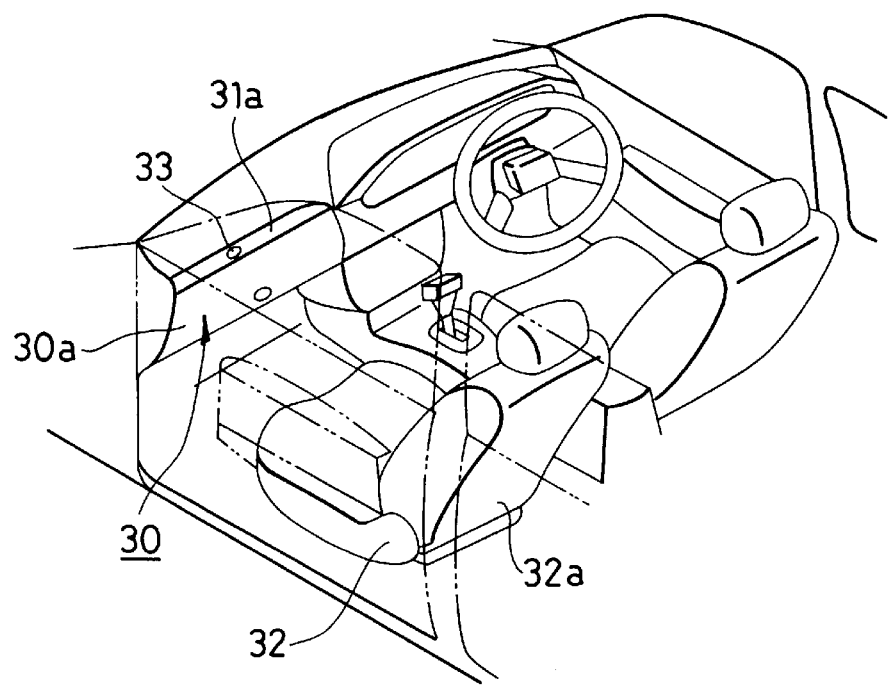
FIG. 9 is an explanatory diagram for a description of an embodiment of the invention.
Figure 10:
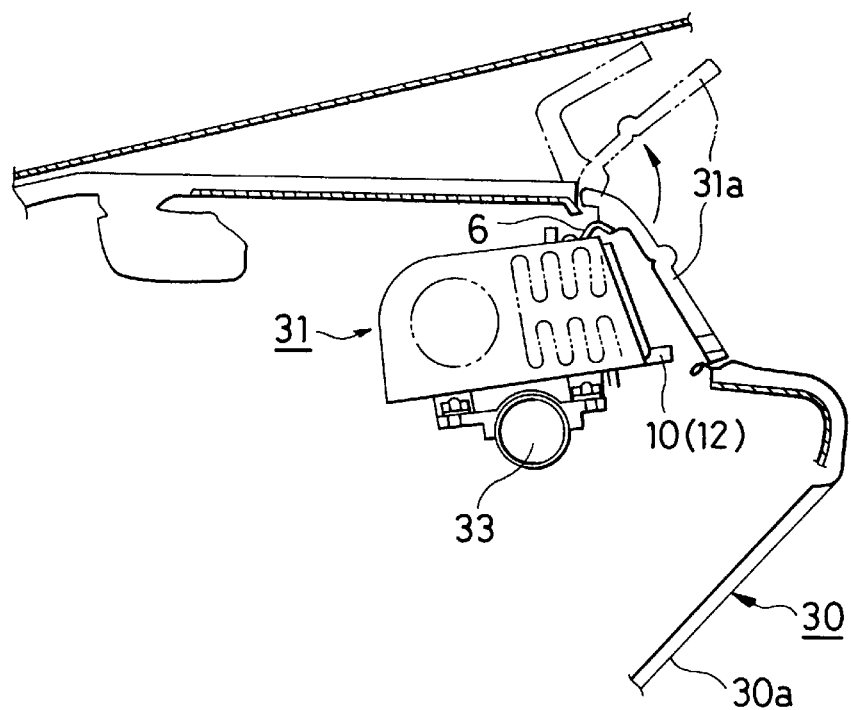
FIG. 10 is an explanatory sectional diagram of an instrument panel for a description of the installation of an ultrasonic wave generator element, and an ultrasonic wave receiver element.

In FIG. 2, reference numeral 10 designates an acoustic wave generator element, namely, an ultrasonic wave generator element which is provided integral with an air bag module 31 which, as shown in FIGS. 9 and 10, is provided near a glove box 30 in front of an assistant driver's bucket seat. The ultrasonic wave generator element 10 is driven by an oscillator 11 having a predetermined frequency (f0 Hz), to emit an ultrasonic wave 13 towards the back 32a of the assistant driver's bucket seat 32. On the other hand, the ultrasonic wave 13 thus emitted is reflected by the back 32a of the assistant driver's bucket seat 32 or the body of a person (a crew member) 14 on the latter 32, thus forming a standing wave between the ultrasonic wave generator element 10 and the back 32a on the assistant driver's bucket seat 32 or between the ultrasonic wave generator element 10 and the body of the person on the assistant driver's bucket seat 32.

When a door state switch (not shown) is turned on by the closure of the door on the side of the assistant driver's bucket seat 32, the oscillator 11 starts oscillation. When, after the vehicle starts traveling, a decision circuit 22 (described later) determines that a person is on the assistant driver's bucket seat 32, the supply of current from a power source circuit 24 to the oscillator 11 is suspended, so that the latter 11 is stopped.

The ultrasonic wave of the predetermined frequency f0 generated by the ultrasonic wave generator element 10 forms a standing wave between the latter 10 and the person (as indicated by the solid line in FIG. 2, posturing as indicated at B) 14 (hereinafter referred to as "a person taking a posture B", when applicable) on the assistant driver's bucket seat 32. How, in the case when the person 14 bends forwardly as indicated at C in FIG. 2 (hereinafter referred to as "a person taking a posture C"), the standing wave changes, will be described below: In addition, a method of detecting the standing wave thus changed will be described.

Figure 3A:
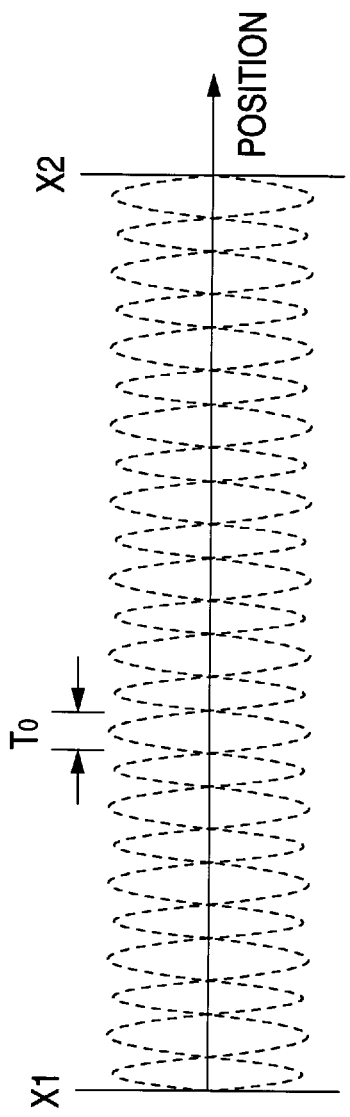
FIGS. 3A to 3C are waveform diagrams for a description of the operation of the device shown in FIG. 2.

First, in FIG. 2, an ultrasonic wave 13 as indicated in FIG. 3A is generated between the position X1 of the ultrasonic wave generator element 10 and the position X2 of the body of the person 14. Between the position X1 of the ultrasonic wave generator element 10 and the position X2 of the body of the person 14, nodes (or anti-nodes) occur at predetermined intervals (depending on the relationship between the frequency and the sonic velocity) with the position X1 of the ultrasonic wave generator element 10 as a reference.

Figure 3B:
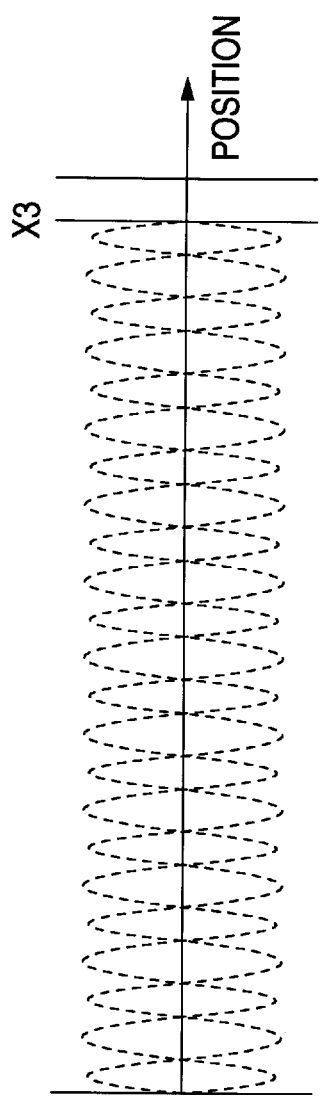
Figure 3C:
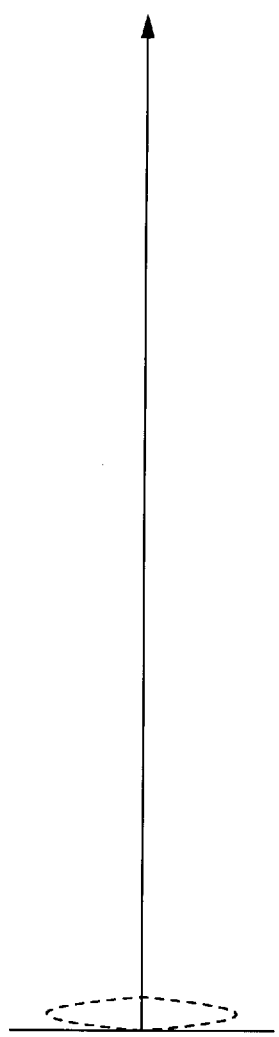

When the person 14 bends forwardly, taking the posture C (indicated by the two-dot chain lines in FIG. 2), the standing wave formed between the position X1 of the ultrasonic wave generator element 10 and the position X3 of the body of the person 14 is decreased in the number of waves as shown in FIG. 3B (one wave being decreased in the case of FIGS. 3A to 3C). A signal corresponding to the wave thus decreased (FIG. 3C) is received by an ultrasonic wave receiver element 12; that is, while the posture B is changed to the posture C, the signal shown in FIG. 3C is applied to the ultrasonic wave receiver element 12.

Next, the case where the person 14 slides the bucket seat forwardly will be described with reference to FIGS. 4 and 5A to 5C.

The ultrasonic wave generator element 10 outputs a predetermined frequency ultrasonic wave, which forms a standing wave between the generator element 10 and the person 14 (indicated by the solid line in FIG. 4) on the assistant driver's bucket seat 32.

Figure 4:
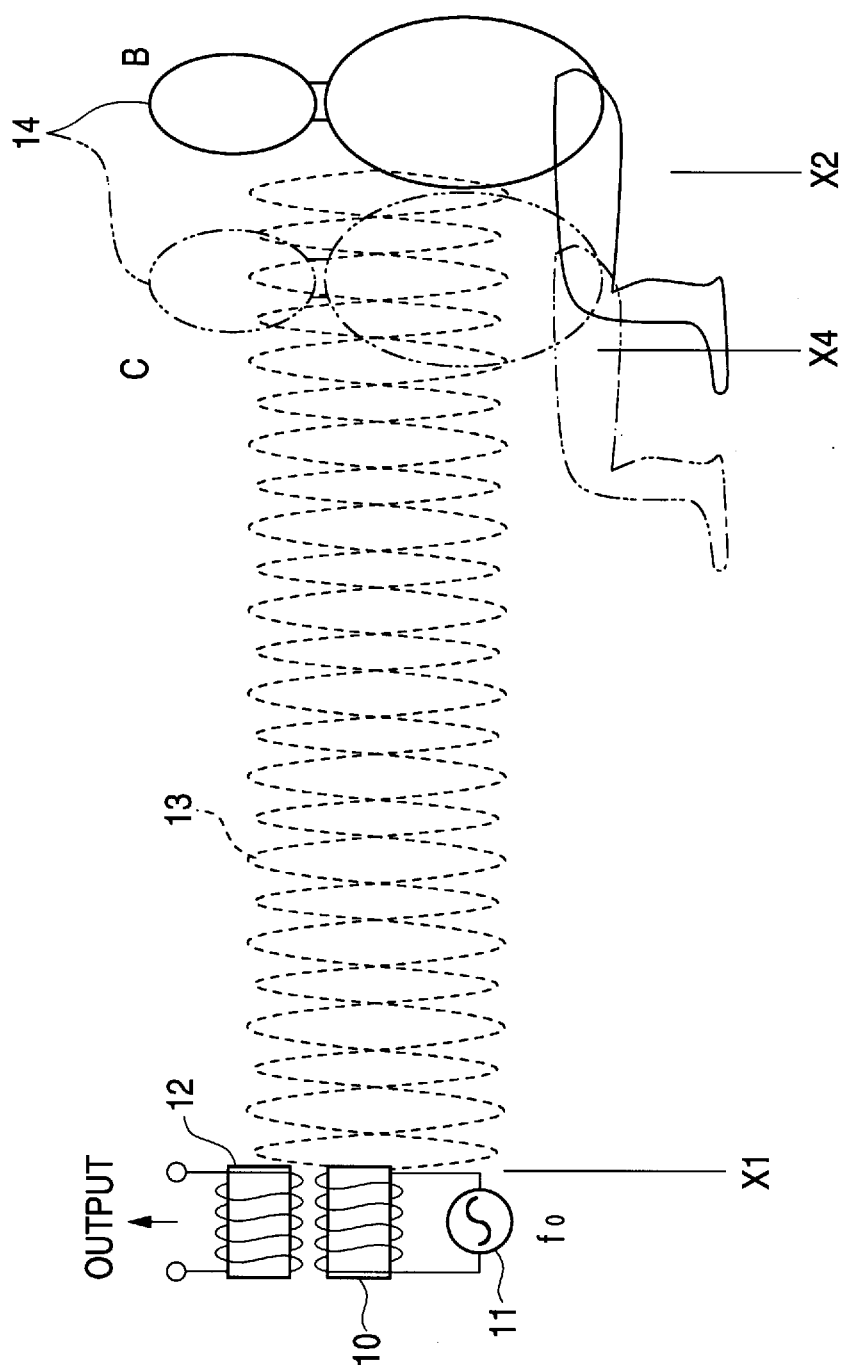
FIG. 4 is an explanatory diagram of a description of another principle of the device according to the invention.
Figure 5A:
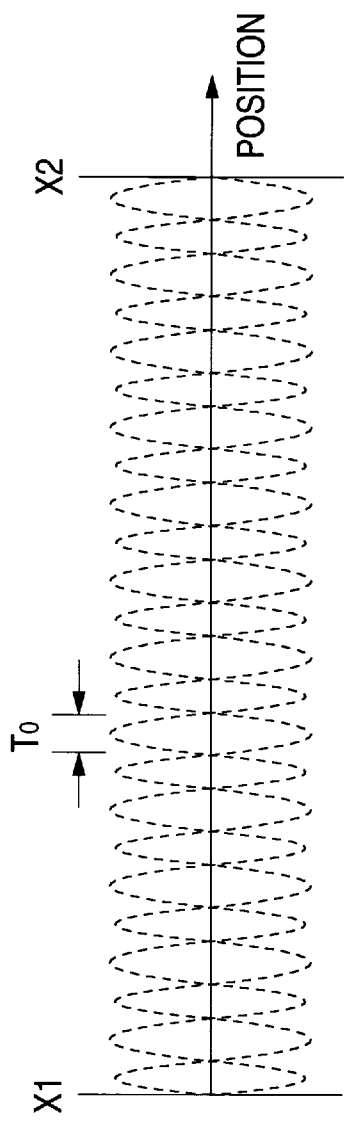
FIGS. 5A to 5C are waveform diagrams for a description of the operation of the device shown in FIG. 4.
Figure 5B:
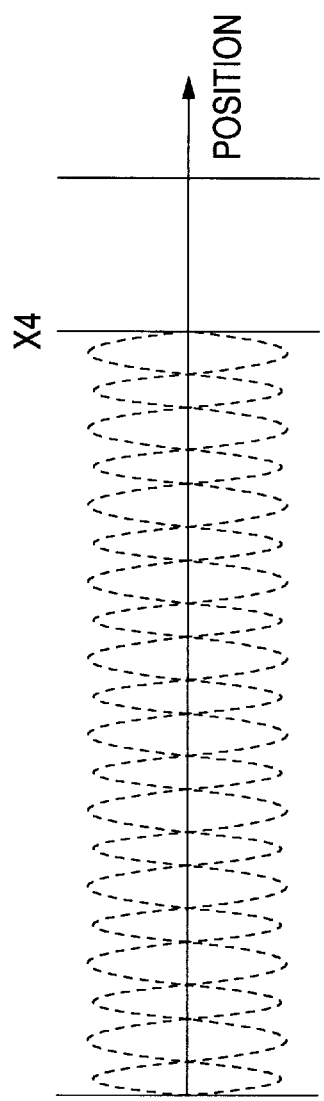
Figure 5C:
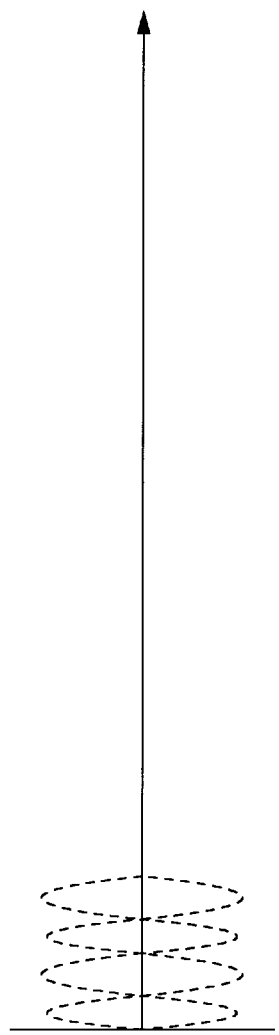

Hence, when the person 14 taking a posture B who is located at the position X2 slides the bucket seat forwardly to the position X4 where the person 14 takes a posture C (indicated by the two-dot chain lines in FIG. 4). The number of waves between the position X1 of the generator element 10 and the position X4 of the body of the person 14 is reduced as much as four (4). A signal corresponding to the four waves is received by the ultrasonic wave receiver element 12; that is, a signal as shown in FIG. 5C is applied to the ultrasonic wave receiver element 12 while the person slides the bucket seat from the position X2 to the position X4. It should be noted that although four waves are shown in FIG. 5C for simplification of description, a large number of waves exist in fact as shown in FIG. 7A.

Now, a method of electrically processing the signal which the ultrasonic wave receiver element 12 receives according to the above-described principle will be described with reference to FIG. 6.

It is assumed that, when the person 14 moves the bucket seat forwardly or backwardly or bends forwardly or backwardly, the ultrasonic wave receiver element 12 receives a signal as shown in FIG. 7A. In this case, the output signal of the ultrasonic wave receiver element 12 is amplified by an amplifier circuit 16, and then applied to a band-pass filter 17, whose frequency band is so determined as to extract only a signal component attributing to the displacement of the person (crew member) 14 (cf. FIG. 7B). In FIG. 6, reference numeral 18 denotes an absolute value circuit which obtains the absolute value of the signal which the band-pass filter 17 extracts (cf. FIG. 7C).

Figure 6:
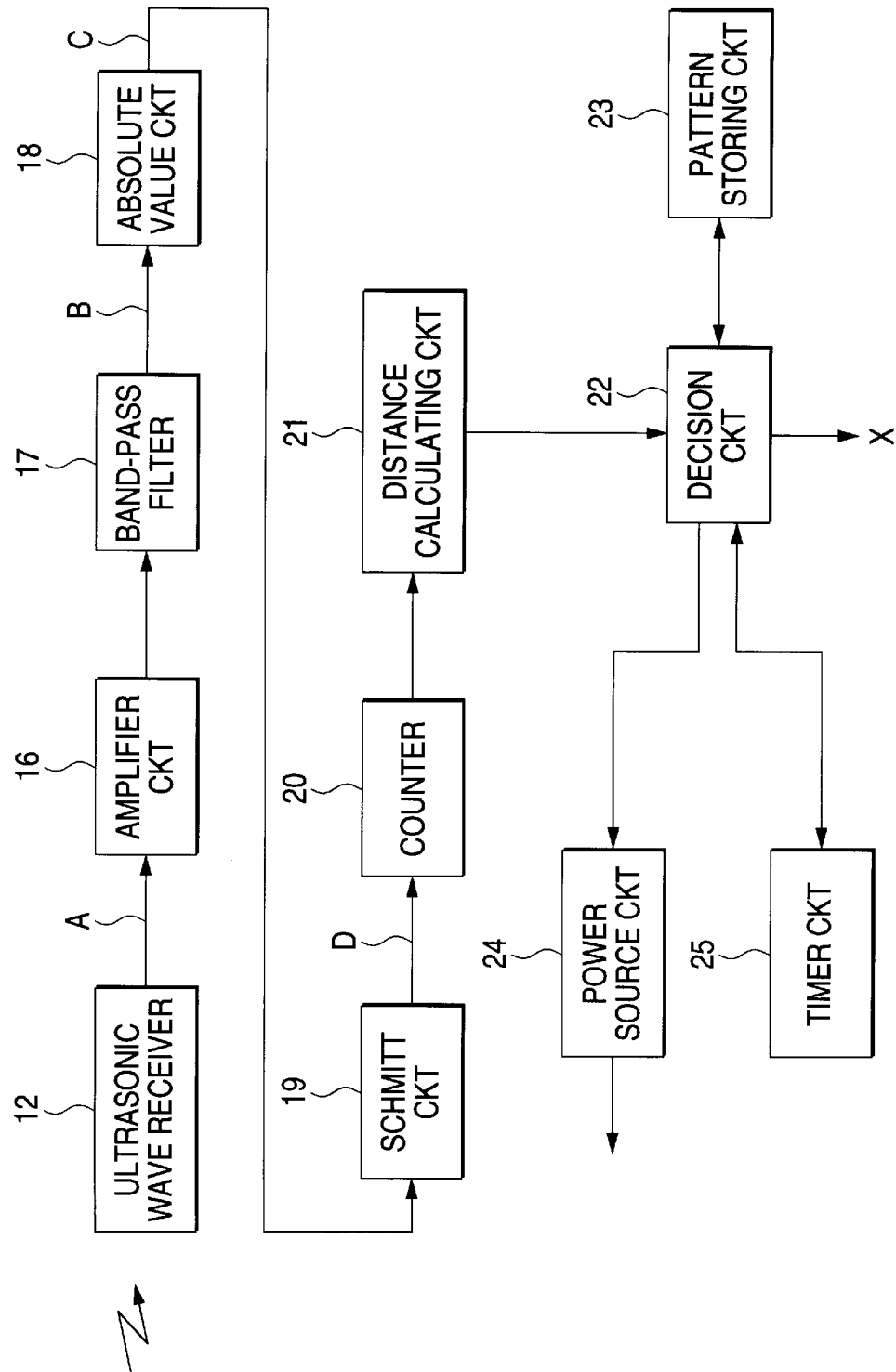
FIG. 6 is a block diagram showing the arrangement of the device of the invention.

Further in FIG. 6, reference numeral 19 designates a Schmitt circuit, which converts a sinusoidal signal (cf. the part (cf. FIG. 7C) into a pulse signal (cf. FIG. 7D) whose pulses are counted by a counter 20; and 21 designates a distance calculating circuit which calculates an amount of movement (or displacement) of the person from the output count value of the counter 20. That is, the amount of movement is calculated according to the following expression:

Amount of movement={(Acoustic velocity)/(Ultrasonic frequency)}×Count value

Figure 8:
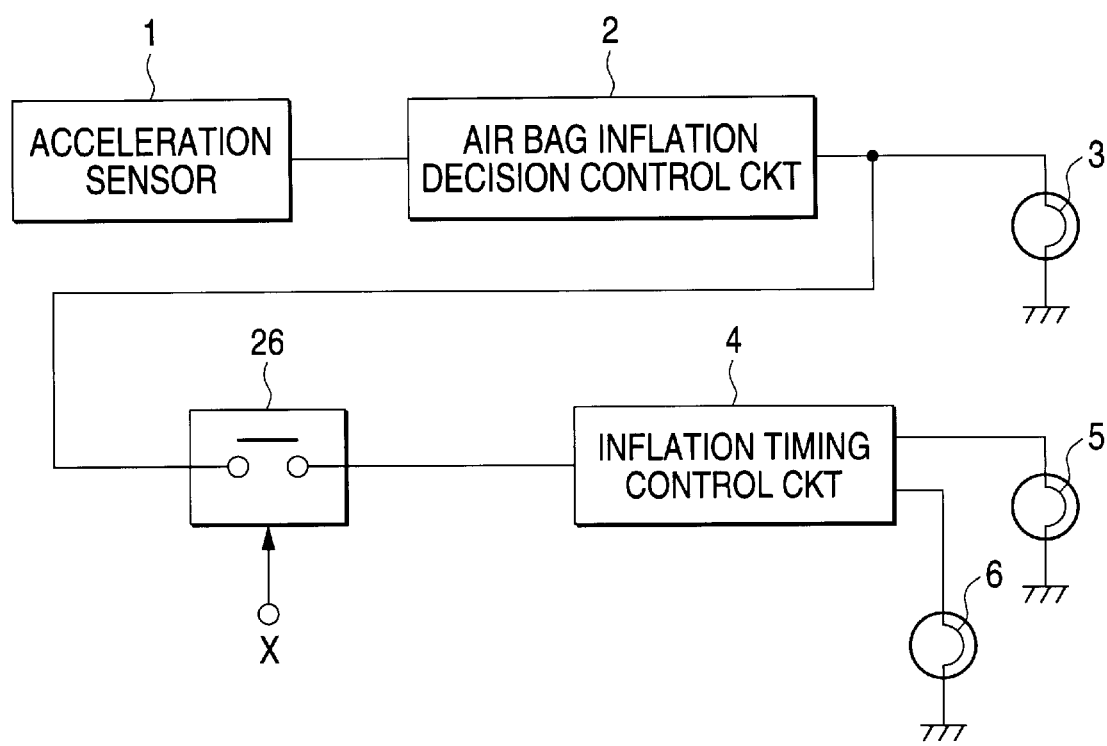
FIG. 8 is a block diagram for a description of an application of the device of the invention to a vehicle crew member protecting device such as an air bag device.

Further in FIG. 6, reference numeral 22 designates the aforementioned decision circuit which operates as follows: Whenever a distance is calculated by the aforementioned distance calculating circuit 21, the time required for the movement; that is, the time which elapses from the time instant that the ultrasonic signal is received until the reception of the ultrasonic signal is suspended (or the time instant that the reception of the ultrasonic signal is considered stopped) is obtained according to a timer signal from a timer circuit 25. Those amounts of distances the person move, and the times required for the movements are arranged in time-series, so that they are compared with a pattern stored in a pattern storing circuit 23, thereby to determine whether the movement attributes to the person or whether it attributes to an object on the bucket seat which is moved by an external force such as the acceleration which is produced for instance when the vehicle is braked. When the decision circuit 22 determines that no person is on the assistant driver's bucket seat, it applies the result of determination to the control terminal X of a switch circuit 26 in FIG. 8, and outputs a signal to turn off the latter 26 and the power source circuit 24. When the decision circuit 22 determines that a person is on the assistant driver's bucket seat 32, the switch circuit 26 is turned on while the power source circuit 24 is turned on.

Now, the operation of the above-described crew member detecting device will be described.

When, with the doors closed, and the ignition switch is turned on for the vehicle's traveling, the power source circuit 24 supplies currents to the various circuits. The ultrasonic wave generator element 10 emits an ultrasonic wave having a predetermined frequency f0 towards the back 32 of the assistant driver's bucket seat 32. When, under this condition, the person 14 on the assistant driver's bucket seat 32 moves forwardly or backwardly, a sinusoidal wave signal whose number of waves is proportional to the amount of movement of the person is detected with the ultrasonic wave receiver element 12. As a result, the pulse signal thereof is counted by the counter 20, and the distance is calculated by the distance calculating circuit 21. Those data are compared with the pattern stored in the pattern storing circuit 23. When the decision circuit 22 determines that a person is on the assistant driver's bucket seat, the decision circuit 22 applies an "on" signal to the control terminal X of the switch circuit 26, to turn on the latter 26, so that the squibs 5 for 6 for the air bags on the side of the assistant driver's bucket seat 32 are driven according to the outputs of the inflation timing control circuit 4.

In FIGS. 9 and 10, reference number 30a designates a cover for the glove box; 31a, a cover for the inflation of the air bag; and 33, a steering member.

Second Embodiment

Figure 11:
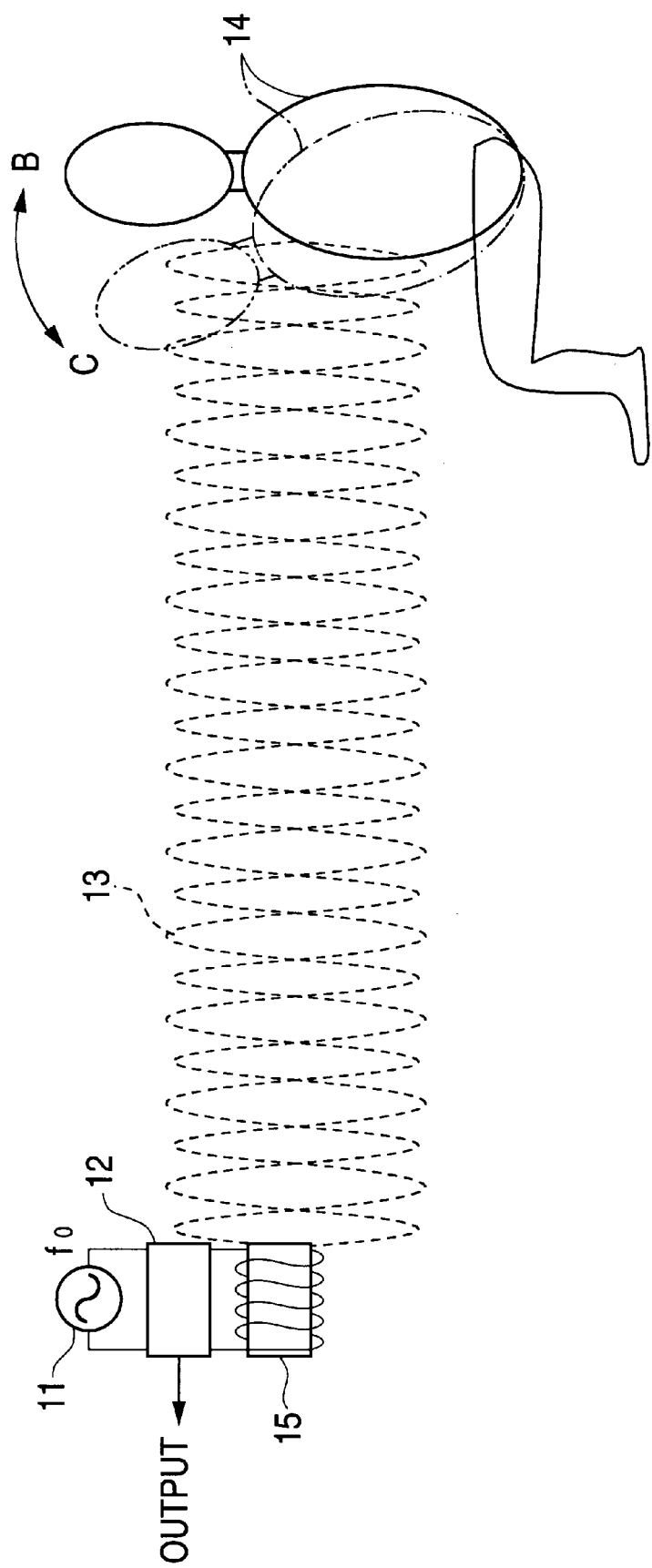
FIG. 11 is an explanatory diagram for a description of a crew member detecting device according to a second embodiment of the invention.
Figure 14:
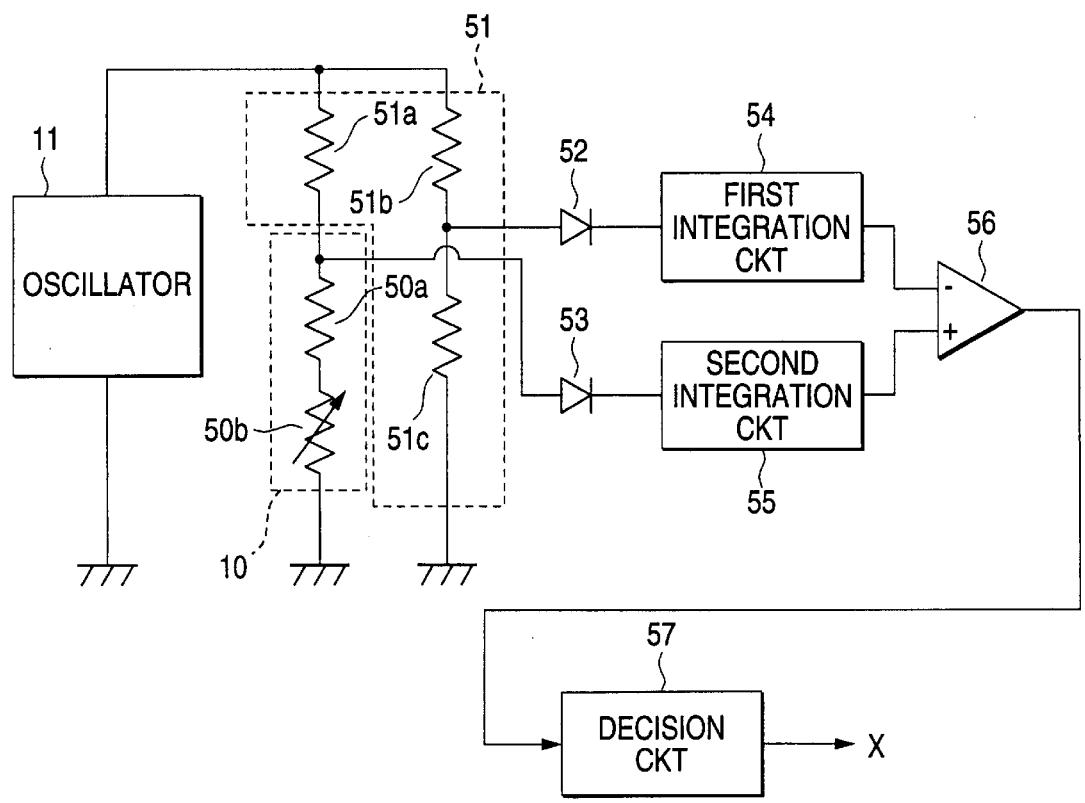
FIG. 14 is a diagram showing the circuit arrangement of the screw member detecting device according to the second embodiment.

A second embodiment of the invention will be described with reference to FIGS. 11 or 14.

In the above-described first embodiment, the ultrasonic wave generator element 10 and the ultrasonic wave receiver element 12 are used so that the ultrasonic wave transmitting operation and the ultrasonic wave receiving operation are carried out separately. On the other hand, in the second embodiment, as shown in FIG. 11, the two operations are carried out with one ultrasonic wave element 15 only.

Figure 12:
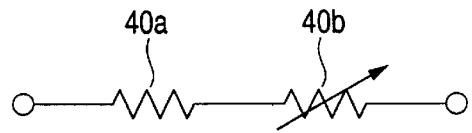
FIG. 12 is a diagram showing an electrical equivalent circuit of an acoustic wave element according to the second embodiment.
Figure 13:
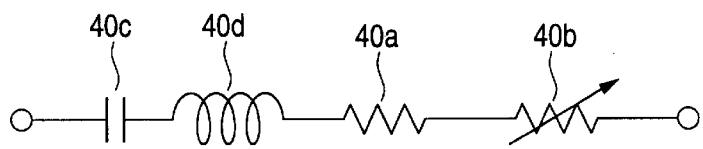
FIG. 13 is a diagram showing an electrical equivalent circuit of an acoustic wave element in the case where the acoustic wave element generates a standing wave in FIG. 11.

That is, the second embodiment is based on variations in acoustic impedance when the ultrasonic wave element 15 is driven with its natural resonance frequency f0. An electrical equivalent circuit of the acoustic impedance is as shown in FIG. 12 or 13. In the case where a standing wave 13 is provided, as shown in FIG. 12 a series circuit is formed which comprises a resistor 40a and a variable acoustic impedance 40b. On the other hand, in the case where no standing wave is provided, a series circuit is formed which comprises a resistor 40a, a variable acoustic impedance 40b, a capacitor 40c, and a coil 40d. By detecting the difference in output between those two series circuits with a bridge circuit 51, it can be determined whether or not the standing wave 13 is provided between the ultrasonic wave generator element 10 and the assistant driver's bucket seat.

The circuit for this detection will be described with reference to FIG. 14.

The ultrasonic wave generator element 10 is connected to three resistors 51a, 51b and 51c, thus forming a bridge circuit 51. An oscillator 11 applies a sinusoidal signal having the natural resonance frequency f0 of the ultrasonic wave generator element 10 to the bridge circuit 51. The output terminals of the bridge circuit 51 are connected to half-wave rectifier circuits, namely, diodes 52 and 53, respectively, the outputs of which are applied to first and second integration circuits 54 and 55, respectively. The integration outputs of those integration circuits 54 and 55 are applied to a comparison circuit 56, which applies pulses to a decision circuit 57 whenever the standing wave is provided. Whenever the decision circuit 57 receives the pulses, it determines that an object has moved a predetermined distance in front of the assistant driver's bucket seat 32, and, depending on the number of pulses, and the frequency of occurrence thereof (depending on whether or not the number of pulses is more than a predetermined value, and whether or not the frequency of occurrence thereof per unitary time is more than a predetermined value) it determines whether the object is the person (crew member) or whether it is for instance a piece of baggage moved when the vehicle is braked.

As is apparent from the above description, the crew member detecting device of the invention is able to readily and positively determine whether an object (like a piece of baggage) is on the assistant driver's bucket seat or whether a person is on it although it is simple in construction.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A crew member detecting device for a vehicle with a bucket seat comprising:

an acoustic wave generator element mounted on a vehicle body, for generating a standing wave having a plurality of loops and nodes between said acoustic wave generator element and the bucket seat; and an acoustic wave receiver element disposed in a region of said standing wave, for measuring the number of the loops or nodes of the standing wave and calculating a displacement value on the basis of a measurement result of the number of the loops or nodes of the standing wave to detect the presence of a person on said bucket seat from variations in the output of said acoustic wave receiver element which are due to the movement of said person on said bucket seat.

2. A crew member detecting device as claimed in claim 1, further comprising:

a band-pass filter for extracting a signal component attributing to the displacement of the person from said acoustic wave generator element;

an absolute value circuit for obtaining a absolute value of a signal outputted from said band-pass filter;

a Schmitt circuit for converting a sinusoidal signal outputted from said absolute value circuit into a pulse signal;

a counter for counting pulse signals outputted from said Schmitt circuit;

a distance calculating circuit for calculating an amount of movement of the person from a count value outputted from said counter 20;

a pattern storing circuit for storing a predetermined pattern; and a decision circuit for determining whether or not a person is on the bucket seat by comparing the amount of movement calculated by said distance calculating circuit with the pattern stored in said pattern storing circuit.

3. A crew member detecting device as claimed in claim 1, wherein said acoustic wave generator element and said acoustic wave receiver element are provided separately.

4. A crew member detecting device as claimed in claim 1, wherein said acoustic wave generator element and said acoustic wave receiver element are contained in a bridge circuit.

* * * * *